(12) United States Patent
Xu et al.

(10) Patent No.: US 8,226,752 B2
(45) Date of Patent: Jul. 24, 2012

(54) METHOD AND APPARATUS FOR AIR PURIFICATION

(75) Inventors: Hai Xu, New Haven, CT (US); Tao Li, Changsha (CN)

(73) Assignee: Hai Xu, New Haven, CT (US)

( * ) Notice: Subject to any disclaimer, the term of this patent is extended or adjusted under 35 U.S.C. 154(b) by 257 days.

(21) Appl. No.: 12/770,039

(22) Filed: Apr. 29, 2010

(65) Prior Publication Data

US 2011/0265656 A1 Nov. 3, 2011

(51) Int. Cl.
B01D 53/02 (2006.01)
(52) U.S. Cl. .......... 96/154; 502/400; 502/405; 264/132; 264/319; 264/489
(58) Field of Classification Search .................... 96/154; 502/405; 264/132, 319, 489
See application file for complete search history.

(56) References Cited

U.S. PATENT DOCUMENTS

| | | | | |
|---|---|---|---|---|
| 3,616,339 A * | 10/1971 | Marzluff | ...................... | 205/763 |
| 4,046,939 A * | 9/1977 | Hart | ................................. | 95/142 |
| 4,289,513 A * | 9/1981 | Brownhill et al. | .............. | 96/135 |
| 4,643,940 A * | 2/1987 | Shaw et al. | ................ | 428/308.4 |
| 5,294,585 A * | 3/1994 | Moreau et al. | ................ | 502/413 |
| 5,411,577 A * | 5/1995 | Moreau et al. | .................... | 95/96 |
| 5,458,784 A * | 10/1995 | Baker et al. | ................... | 210/674 |
| 5,556,439 A * | 9/1996 | Rink et al. | ...................... | 55/487 |
| 6,080,281 A * | 6/2000 | Attia | .......................... | 204/157.3 |
| 6,638,354 B2 * | 10/2003 | Stephens et al. | ............. | 106/624 |
| 6,790,390 B2 * | 9/2004 | Py et al. | ........................ | 264/29.1 |
| 6,806,227 B2 * | 10/2004 | Coronado et al. | ........... | 502/405 |
| 6,814,771 B2 * | 11/2004 | Scardino et al. | ............. | 55/385.3 |
| 6,919,109 B2 * | 7/2005 | Nakano et al. | ............. | 428/32.26 |
| 6,991,773 B2 * | 1/2006 | Jhi et al. | ..................... | 423/648.1 |
| 7,022,158 B2 * | 4/2006 | Seguin et al. | ..................... | 95/90 |
| 7,435,286 B2 * | 10/2008 | Olson et al. | ..................... | 95/142 |
| 7,563,305 B2 * | 7/2009 | Zimmermann | ................... | 95/90 |
| 7,862,646 B2 * | 1/2011 | Carruthers et al. | ............. | 95/131 |
| 2004/0058202 A1* | 3/2004 | Payne et al. | ..................... | 428/704 |
| 2005/0172813 A1* | 8/2005 | Mifune et al. | .................. | 96/108 |
| 2006/0048646 A1* | 3/2006 | Olson et al. | ..................... | 95/134 |
| 2006/0240218 A1* | 10/2006 | Parce | ............................... | 428/98 |
| 2009/0062119 A1* | 3/2009 | Olson et al. | ................... | 502/417 |

* cited by examiner

*Primary Examiner* — Robert J Hill, Jr.
*Assistant Examiner* — Christopher P Jones
(74) *Attorney, Agent, or Firm* — Michaud-Kinney Group LLP

(57) ABSTRACT

An air purification device that is decorative and effective in removing contaminants from indoor air. The air purification device includes a carbon matrix composite.

15 Claims, 3 Drawing Sheets

US 8,226,752 B2

METHOD AND APPARATUS FOR AIR PURIFICATION

BACKGROUND

1. Field

The present disclosure relates to a filter for air purification. More particularly, the present disclosure relates to a carbon matrix composite used for air purification and a method of making the same.

2. Description of Related Art

Many methods and devices have been developed and employed to maintain clean indoor air. Examples of such air cleaning (also referred to as "air purification") methods and devices include, but are not limited to, air conditioning systems, air purification devices, air ionizers, furnace filters, and the like.

Carbonaceous material, such as activated carbon, is a common component in filters for removing contaminants from air and water. Many systems, typically of the commercial and/or industrial type, have utilized carbonaceous material in an effort to clean air present in, for example, coal combustion plants, vehicle emissions, aquarium filtration, and the like.

While air cleaning methods and devices seek to remove contaminants from indoor air, many people simply mask contaminated indoor air with fragrances from sprays, candles, deodorizers, and the like since such items are typically more discrete or decorative than air cleaning devices. However, sprays, candles and the like only mask odors and do not remove contaminants from the air. Accordingly, what is needed in the art is an effective, yet decorative, air purification device.

SUMMARY

One aspect of the disclosed subject matter relates to a carbon matrix composite comprising: activated carbon; an aerogel; a water-based macromolecule; and water.

Another aspect of the disclosed subject matter relates to an indoor air purification device comprising: a carbon matrix composite as described above and a support selected from a decorative support, a structural support or a combination thereof.

Yet another aspect of the disclosed subject matter relates to a method of making a carbon matrix composite for use in an indoor air purification device, the method comprising: combining activated carbon, a water-based macromolecule and an aerogel to form a mixture of the same; sieving the mixture and recovering a solid form of a carbon matrix composite; hot press molding the solid form of the carbon matrix composite to a desire shaped to form a shaped carbon matrix composite; and drying the shaped carbon matrix composite, thereby making a carbon matrix composite for use in an indoor air purification device.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
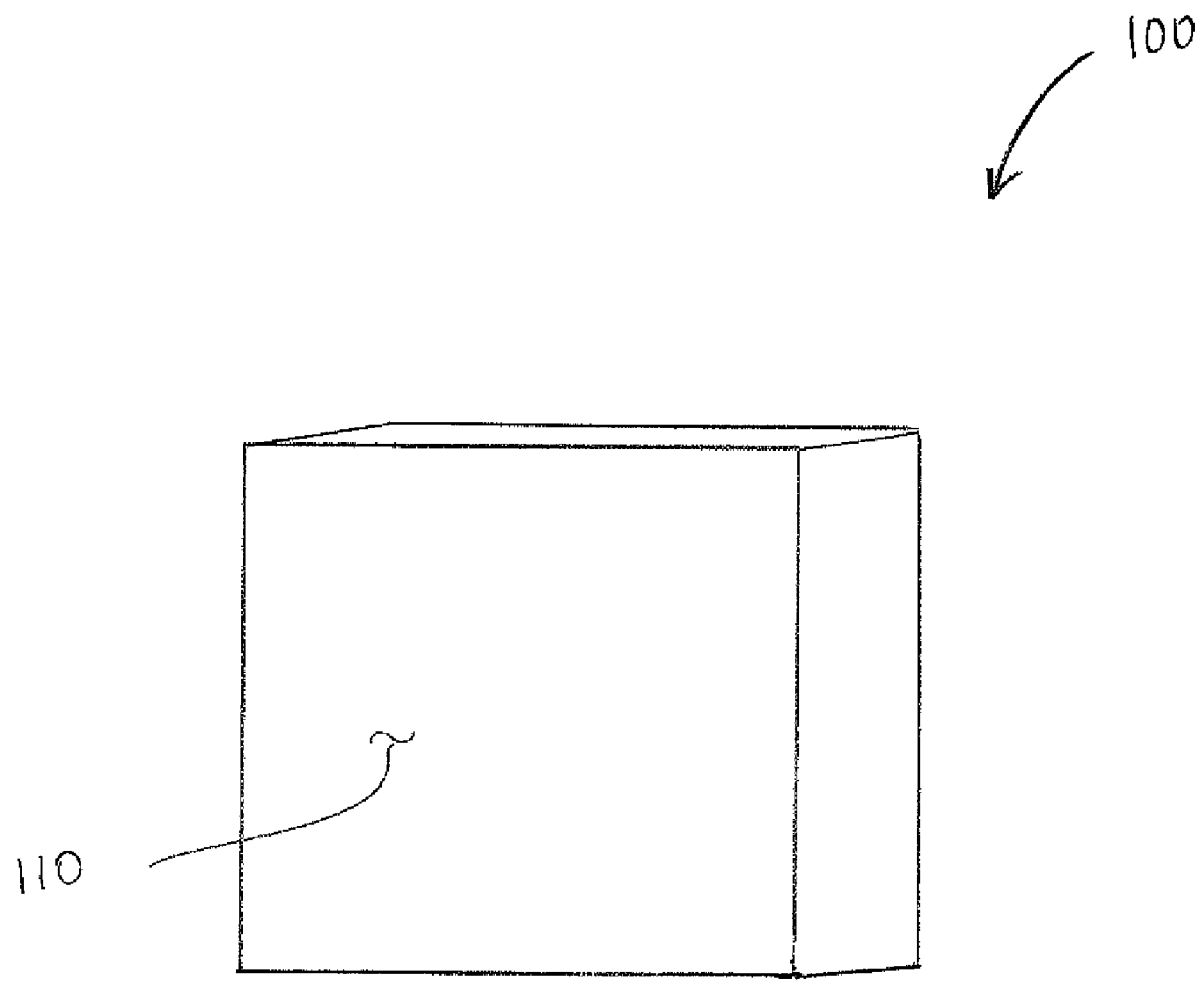
FIG. 1 is a perspective view of a carbon matrix composite according to an embodiment described herein.

FIG. 1 illustrates a perspective view of a carbon matrix composite 100 having at least one surface 110. The carbon matrix composite is effective in removing or reducing an amount of contaminants present in air found indoors, e.g., inside a residential, commercial or industrial structure, such as a home, an office or office building, or a factory. Examples of contaminants include, but are not limited to, pollen, dust, smoke, bacteria, odor-causing substances, harmful gases such as carbon monoxide, and the like.

While FIG. 1 illustrates the carbon matrix composite 100 having a cube-like shape, it is contemplated that the carbon matrix composite may have any shape desired by the manufacturer or purchaser of the same. Other shapes include, but are not limited to: a sheet, a sphere, a pyramid, and the like. Additionally, it is contemplated that the surface 110 may be flat, rounded, curvy, or include some other pattern.

In one embodiment, the carbon matrix composite 100 includes activated carbon, an aero gel, a water-based macromolecule, and water. In another embodiment, the carbon matrix composite 100 also includes a graphitic matrix, such as, for example, graphitic carbon. In yet a further embodiment, the composite also includes another carbon matrix, such as, for example, fullerene, nanotube, and the like.

The amounts and ratios of each component will vary between applications of the carbon matrix composite 100. The amounts and ratios of each component in the carbon matrix composite 100 may be adjusted by the manufacturer depending on the availability of the components, the desires of the purchaser(s) and/or the intended use of the composite. In one embodiment, the carbon matrix composite 100 includes about 50-60 wt. % activated carbon, 10-20 wt. % water-based macromolecule, 10-20 wt. % water, and about 0.5-10% wt % aero gel, based on the total weight of the carbon matrix composite. In another embodiment, the amount of aerogel added to the carbon matrix composite 100 is very small, and is done on a volume basis, e.g., it is added to the other components at a volume equal to the total volume of the water, activated carbon and water-based macromolecule.

The activated carbon is typically in a powdery or particulate form. In one specific example, the activated carbon in the carbon matrix composite 100 is powdery activated carbon (PAC) having less than 8% ash content, less than 3% water content, and a particle size of about 180 mesh or greater. The activated carbon generally has a pH of about 8 or less.

In general, the activated carbon may have pores of one of the following sizes: (1) a macropore having a diameter greater than 50 nanometer (nm); (2) a micropore having diameter less than 2 nm; and (3) a mesopore having a diameter between 2 nm and 50 nm.

Contaminants found in indoor air typically have diameters of less than 2 nm. Accordingly, in order to capture the contaminants in the composite, the pore size of the activated carbon must be large enough to accommodate the contaminant molecules. In one embodiment, the majority of the activated carbon in the carbon matrix composite 100 has micropores having a diameter of less than 2 nm. In another embodiment, at least 80% of the activated carbon in the composite has micropores having a diameter of less than 2 nm. In another embodiment, at least 90% of the activated carbon in the carbon matrix composite 100 has micropores. The remaining activated carbon in the carbon matrix composite 100 may have macropores and/or mesopores. In yet a further embodiment, 100% of the activated carbon in the carbon matrix composite 100 has micropores.

The micropores of the activated carbon are smaller than the molecules forming the aerogel and water-based macromolecule. Accordingly, the molecules of the aerogel and water-based macromolecule cannot fit inside the pores of the activated carbon. Therefore, the presence of the aerogel and the water-based macromolecule in the composite does not impede the use of the composite to remove contaminants from indoor air.

Aerogel is a manufactured material and is derived from a gel in which the liquid component of the gel has been replaced with a gas. Aerogels are an extremely low-density solid with several remarkable properties, most notably its effectiveness as a thermal insulator. The aerogel used in the carbon matrix composite 100 may be a silica aerogel or a carbon aerogel. In one example, the aerogel is a carbon aerogel. In another example, the aerogel is a carbon aerogel having a porosity of greater than about 99.8%, a density of about 0.003 g/cm$^3$, a thermal conductivity of about 0.013 W·k$^{-1}$·m$^{-1}$ at room temperature and a particle size between about 150 mesh and about 300 mesh.

The carbon matrix composite 100 also includes a water-based macromolecule. As is readily appreciated in the art, the term "macromolecule" refers to a molecule of high relative molecular mass, the structure of which essentially comprises the multiple repetitions of units derived, actually or conceptually, from molecules of low relative molecular mass. While it is contemplated that any water-based macromolecule may be used in the carbon matrix composite 100 described herein, one example of an effective water-based macromolecule includes a cationic water-borne butadiene-styrene latex.

In one embodiment of the carbon matrix composite 100, the water-based macromolecule is a cationic water-borne butadiene-styrene latex having a particle size of about 150 nm and a solids content between 49 wt. % to about 51 wt. % based on the weight of the entire cationic water-borne butadiene-styrene latex compound. The pH of the cationic water-borne butadiene-styrene latex may be between about 6.5 and about 7.5, while the density of the compound is about 1.01 g/cm$^3$.

In addition to the components above, the carbon matrix composite 100 may also include water. In one embodiment the carbon matrix composite 100 includes an aerogel, a water-based macromolecule and water in a 1:1 ratio of aerogel and water-based macromolecule to water (aerogel and water-based macromolecule:water).

In a specific embodiment, the carbon matrix composite 100 includes powdery activated carbon, a carbon aerogel, a cationic water-borne butadiene-styrene latex and water. A specific example of the carbon matrix composite 100 includes 60 wt. % activated carbon, 20 wt. % cationic water-borne butadiene-styrene latex and 20 wt. % water, the weight percents based on the total weight of the composite, with the carbon aerogel added on a volume basis in a volume equal to the volume of the activated carbon, cationic water-borne butadiene-styrene latex and water.

Figure 2:
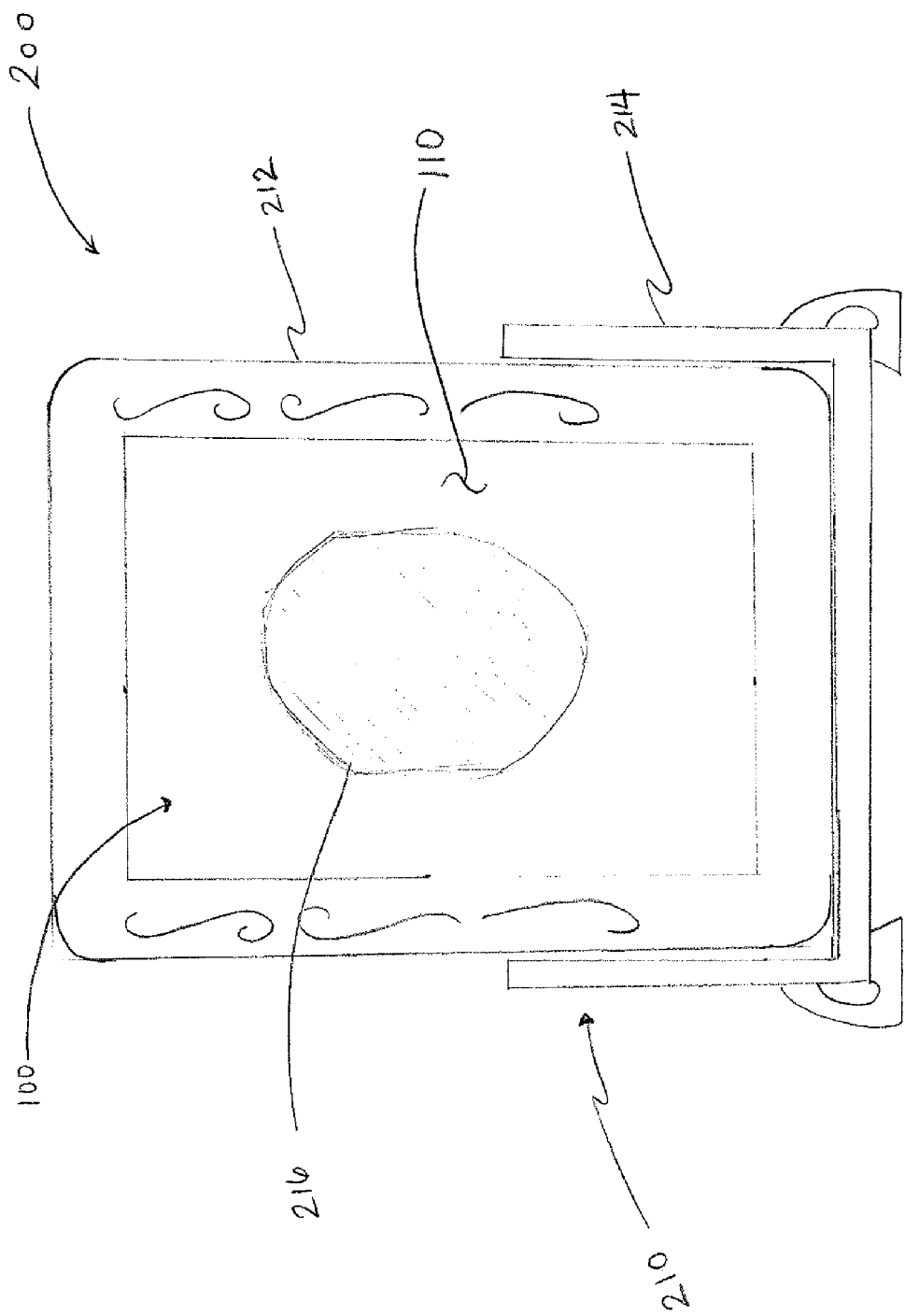
FIG. 2 is a front plan view of decorative air purification device according to an embodiment described herein.

Now referring to FIG. 2, the carbon matrix composite 100 may be used in an indoor air purification device 200. While FIG. 2 illustrates a decorative air purification device 200, it is contemplated that the air purification device may not be decorative, but rather structural in nature, e.g., form the part of a building or room and blend in with the structure of the building or room.

FIG. 2 illustrates a decorative air purification device 200 that includes the carbon matrix composite 100 placed in a support 210. The support 210 may be a decorative support, a structural support, or a combination thereof, e.g., be a part of the structure of a building or a room but also have decorative features.

Examples of a decorative support 210 include, but are not limited to, a plate, a vase, a lamp base, a picture frame, a stand, a statuette, millwork, a minor frame, and the like, and combinations thereof. Examples of a structural support 210 include, but are not limited to, cabinet frames, cabinet doors, floor boards, ceiling beams, window frames, support beams, and the like, and combinations thereof. As shown in FIG. 2, the support 210 includes two (2) portions: a frame 212 and a stand 214. The air purification device 200 is not limited in this regard as the support 210 may include one or multiple portions. If the support 210 includes multiple portions, it is noted that one or more portions may be a decorative support and one or more portions may be a structural support.

Still referring to FIG. 2, it is contemplated that the carbon matrix composite 100 may include a design 216 painted on one or more of the surfaces 110. The design 216 may be any design desired by the manufacturer or consumer of the carbon matrix composite 100 or the air purification device 200. The paint used to complete the design 216 should not impede the absorption of contaminants by the carbon matrix composite 100 from the indoor air. However, the paint used to complete the design 216 should be stable enough to last the useful life of the carbon matrix composite 100. Examples of paint include, but are not limited silicone dye, latex paint, and the like.

In another embodiment, the design 216 may be carved into the surface 110 of the carbon matrix composite 100. In this embodiment, the design 216 may or may not be painted. While not shown in FIG. 2, it is contemplated that the surface 110 of the carbon matrix composite 100 may include more than one design 216.

Figure 3:
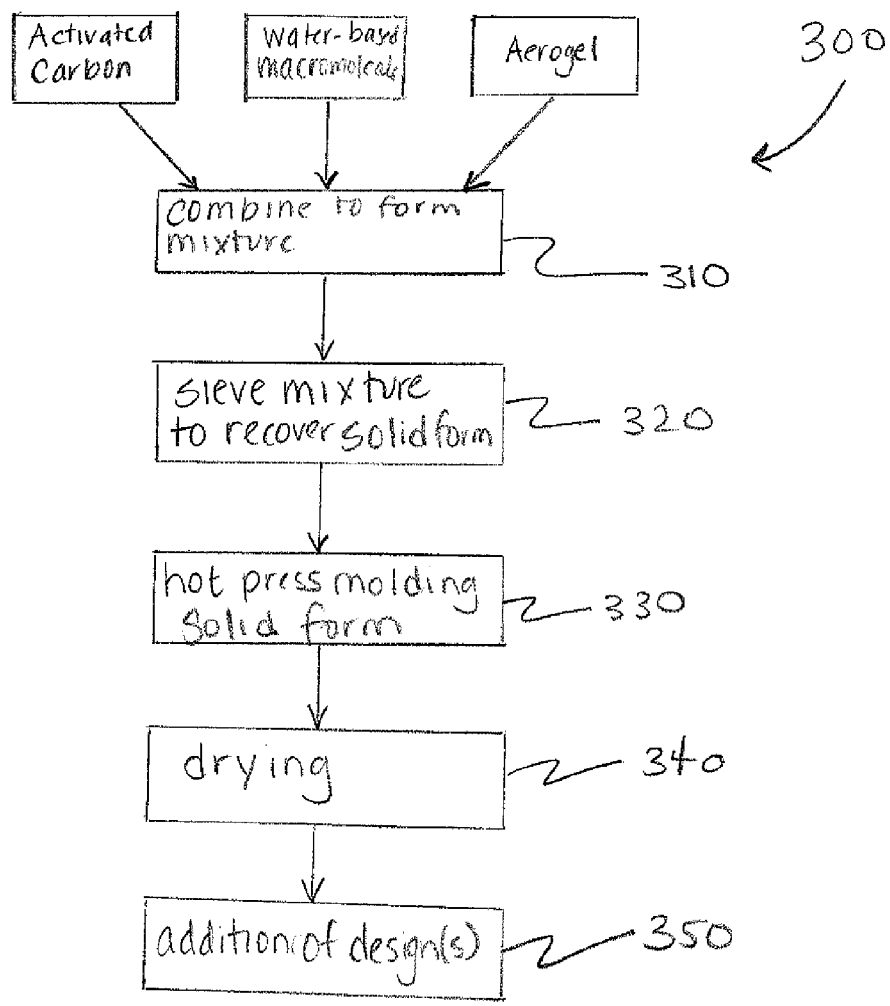
FIG. 3 is a flow chart of a method for making a carbon matrix composite.

In one embodiment, as shown in FIG. 3, the carbon matrix composite 100 is made by a method 300. In a first step 310, the activated carbon, water-based macromolecule and aerogel are combined to form a mixture of the same. The activated carbon, water-based macromolecule and aerogel may be combined in any manner, such as a mechanical mixer, to facilitate the formation of a mixture having even distribution of the components.

After the mixture of activated carbon, water-based macromolecule and aerogel is formed, the mixture is sieved in step 320 to recover a solid form of the carbon matrix composite. The sieving step allows the portion of the mixture that has created a solid form to be separated from loose particles in the mixture.

The solid form of the carbon matrix composite recovered by the sieving step 320 is then subjected to hot press molding in step 330. The hot press molding is done to shape the solid form of the carbon matrix composite into desired shapes, including, but not limited to, a cube, a sphere, and the like. In one embodiment, the hot press molding is done at a pressure of about 400 Mpa and a temperature of between about 200° C. to about 280° C. The hot press molding is conducted in machines readily known in the art, including machines that impart pressure to the solid form of the carbon matrix composite.

After the hot press molding, the shaped carbon matrix composite is allowed to dry in step 340. It is contemplated that the drying step 340 may simply include self-drying of the shaped carbon matrix composite in the air over a period of time, e.g., overnight. However, it is also contemplated that the drying step 340 may include one or more of the following drying procedures: air drying, drying in an activation furnace, and drying in a vacuum furnace.

In one specific embodiment, the drying step 340 includes air-drying the shaped carbon matrix composite overnight (e.g., at least about 8-12 hours), followed by drying in a conventional microwave at full power for about two (2) hours. After microwaving, the shaped carbon matrix composite is placed into an activated furnace at about 600° C. for about twenty-four (24) hours, followed by a second air drying overnight (e.g., at least about 8-12 hours). After the second air-drying step, the shaped carbon matrix composite is then placed into a vacuum furnace heated at 100° C. for at least about 8-12 hours, after which the shaped carbon matrix composite is cooled.

After the drying step 340, designs, such as carvings and/or paintings, may be added to the shaped carbon matrix composite in step 350. After the design(s) are added to the shaped carbon matrix composite, it may be placed in an air purification device 200 and/or packaged and stored for subsequent sale or shipping.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A carbon matrix composite comprising:
   activated carbon;
   an aerogel;
   a water-based macromolecule; and
   water.

2. A carbon matrix composite according to claim 1, wherein the aerogel is a carbon aerogel.

3. A carbon matrix composite according to claim 1, further comprising a graphitic matrix.

4. A carbon matrix composite according to claim 1, wherein the water-based macromolecule is a cationic water-borne butadiene-styrene latex.

5. An indoor air purification device comprising:
   a carbon matrix composite according to claim 1; and
   a support selected from a decorative support, a structural support or a combination thereof.

6. An indoor air purification device according to claim 5, wherein the aerogel of the carbon matrix composites is a carbon aerogel.

7. An indoor air purification device according to claim 5, wherein the carbon matrix composite further comprises a graphitic matrix.

8. An indoor air purification device according to claim 5, wherein the water-based macromolecule of the carbon matrix composite is a cationic water-borne butadiene-styrene latex.

9. An indoor air purification device according to claim 5, wherein the decorative support structure is selected from a group consisting of a plate, a vase, a stand, a lamp base, a picture frame, a statuette, millwork, a mirror frame and combinations thereof.

10. An indoor air purification device according to claim 5, wherein the structural support structure is selected from the group consisting of a cabinet frame, a cabinet door, a floor board, a ceiling beam, a window frame, a support beam and combinations thereof.

11. An indoor air purification device according to claim 5, further comprising a design painted on a surface of the carbon matrix composite.

12. A method of making a carbon matrix composite for use in an indoor air purification device, the method comprising:
    combining activated carbon, a water-based macromolecule and an aerogel to form a mixture of the same;
    sieving the mixture and recovering a solid form of a carbon matrix composite;
    hot press molding the solid form of the carbon matrix composite to a desire shaped to form a shaped carbon matrix composite; and
    drying the shaped carbon matrix composite, thereby making a carbon matrix composite for use in an indoor air purification device.

13. A method according to claim 12, wherein the drying step comprises the steps of:
    air drying;
    microwaving the shaped solid mixture;
    placing the shaped solid mixture into an activated furnace; and
    placing the shaped solid mixture into a vacuum furnace.

14. A method according to claim 12, further comprising adding designs to the dried shaped carbon matrix composite.

15. A method according to claim 14, wherein the step of adding designs to the dried shape comprises carving on a surface of the dried shape, painting on the surface of the dried shape, and a combination thereof.

* * * * *